A. A. BLIVEN.
CAR BRAKE.
No. 88,438. Patented Mar. 30, 1869.
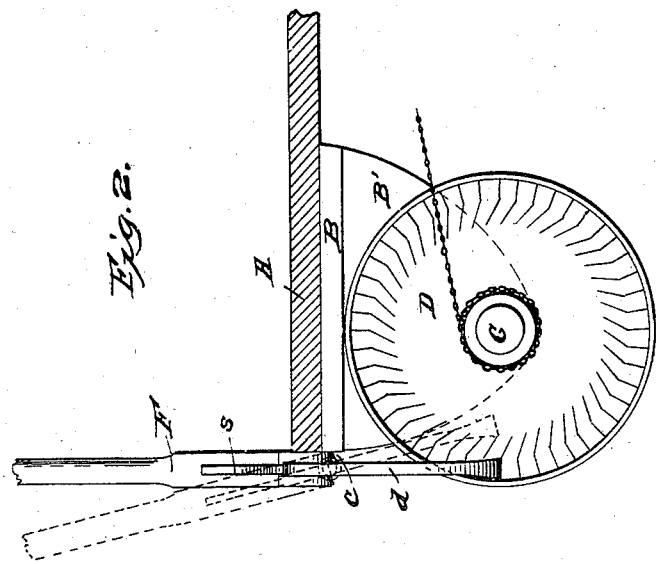
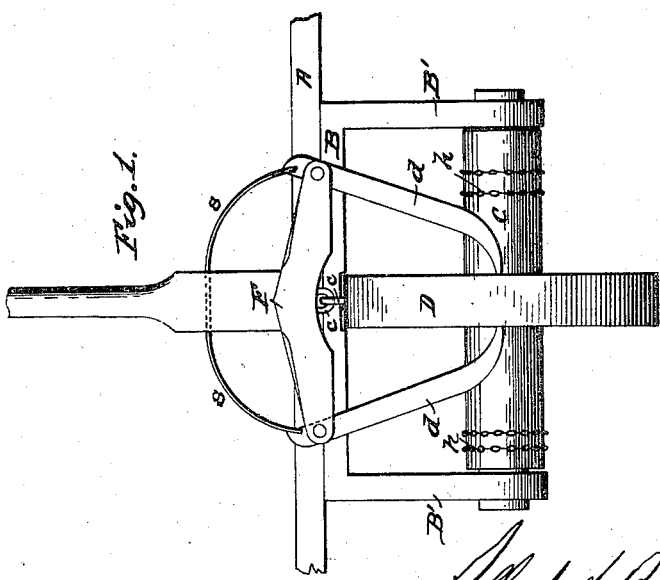
Witnesses

United States Patent Office.

ALBERT A. BLIVEN, OF JERSEY CITY, NEW JERSEY.

Letters Patent No. 88,438, dated March 30, 1869.

IMPROVED CAR-BRAKE.

The Schedule referred to in these Letters Patent and making part of the same.

To all whom it may concern:

Be it known that I, ALBERT A. BLIVEN, of Jersey City, in the county of Hudson, and State of New Jersey, have invented a new and improved Car-Brake; and I do hereby declare that the following is a full, clear, and exact description of the same, reference being had to the accompanying drawings, forming a part of this specification, and in which—

Figures 1 and 2 represent different views of a car-brake constructed according to my invention, taken at right angles to each other.

Similar letters of reference indicate corresponding parts in both figures.

This invention consists in a novel construction of a railway-car brake, whereby efficiency and great power are obtained, and whereby the braking of two carriages may be effected at the same time by one man.

To enable others to understand the construction and operation of my invention, I will proceed to describe it, with reference to the drawings.

A is the platform of a railway-car, to the under side of which is bolted a frame, B B'. This frame is constructed of cast-iron or other metal, and consists of a horizontal plate, B, and two downwardly-extending lugs B'.

C is a horizontal shaft, suspended within this frame, and carrying upon its central portion a ratchet-wheel, D.

Said ratchet-wheel D is provided with its teeth upon its sides, instead of its periphery, and is operated by means of pawls $d\ d$.

Said pawls $d\ d$ are pivoted to the extended arms of an inverted T-shaped lever, F, and their points held against the sides of the ratchet-wheel D, and between the teeth thereof, by means of bow-springs $s\ s$, or other suitable spring-attachment.

The inverted T-shaped lever F is pivoted, or linked at its lower extremity, to the central portion of the front edge of the frame B B', by means of staples $e\ e'$, or other universal joint, so as to have a forward and backward, as well as a lateral motion.

The lateral motion of the said lever F will, by the alternate action of the pawls $d\ d$ against the teeth of the ratchet-wheel, cause the rotating of the shaft C, while its forward and backward movement will cause, respectively, the engagement and disengagement of the said pawls and ratchet, as illustrated by those parts of fig. 2 represented in red outline.

Attached to the shaft C are chains $h\ h$, which, passing forward and rearward, respectively, are connected with the shoes of the carriage upon which the apparatus is attached, and the one to which said carriage is coupled, so that the rotating of the shaft will, by the winding up of the chains, cause the braking of the wheels of both carriages.

What I claim as my invention, and desire to have secured by Letters Patent, is—

The shaft C, ratchet D, pawls $d\ d$, and lever F, combined and applied to a railway-car, whereby the braking of the wheels of one or more cars may be effected by the lateral movements of the lever, and the release-ment of the wheels by the forward movement of the same, substantially as described.

ALBERT A. BLIVEN.

Witnesses:
 FRED. HAYNES,
 JOHN B. PERRY.